Figure 1:
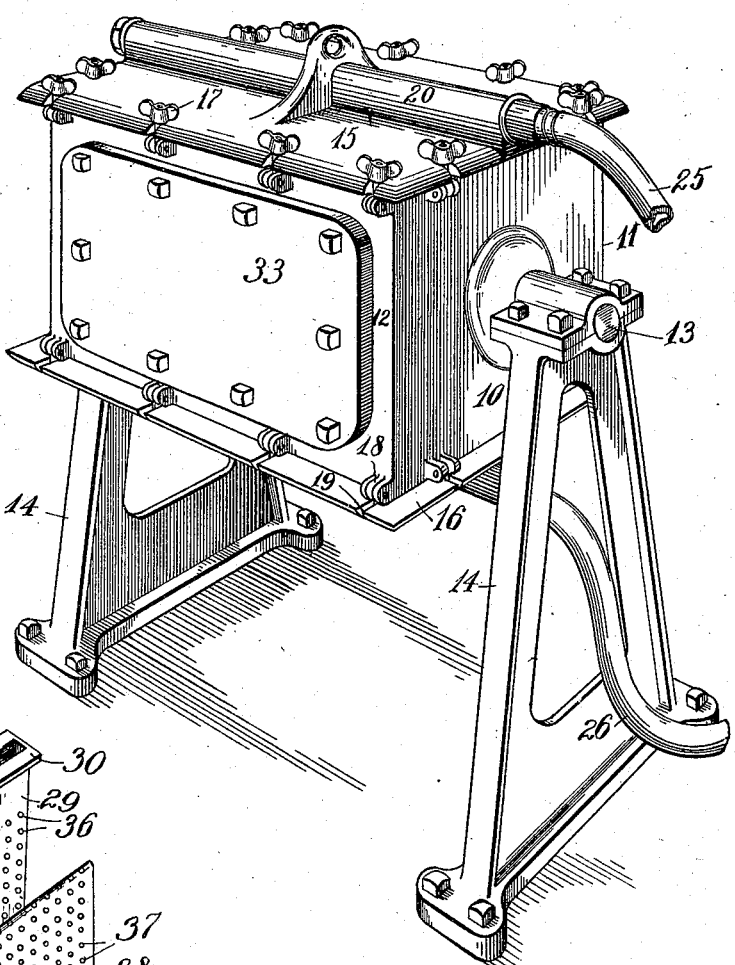

No. 867,734. PATENTED OCT. 8, 1907.
G. KNOCK.
FILTER.
APPLICATION FILED APR. 8, 1907.

2 SHEETS—SHEET 1.

WITNESSES:
Brennan B. West.
Nathan F. Fretter.

INVENTOR.
George Knock
BY Bates, Fouts & Hull,
ATTYS.

No. 867,734. PATENTED OCT. 8, 1907.
G. KNOCK.
FILTER.
APPLICATION FILED APR. 8, 1907.

2 SHEETS—SHEET 2.

WITNESSES: INVENTOR,
George Knock
BY Bates, Fouts & Hull
ATTYS.

UNITED STATES PATENT OFFICE.

GEORGE KNOCK, OF CLEVELAND, OHIO.

FILTER.

No. 867,734.  Specification of Letters Patent.  Patented Oct. 8, 1907.

Application filed April 8, 1907. Serial No. 366,937.

*To all whom it may concern:*

Be it known that I, GEORGE KNOCK, residing at Cleveland, in the county of Cuyahoga and State of Ohio, have invented a certain new and useful Improvement in Filters, of which the following is a full, clear, and exact description, reference being had to the accompanying drawings.

The object of this invention is to provide in a very simple form a filter suitable for filtering beer and other liquids, the filter being so arranged and constructed that the filter material may be quickly and conveniently removed and the filter cleaned and repacked.

In filtering beer it is customary to use a filtering material of pulp, and in the various filters with which I have been familiar, so much time has been involved in cleaning out the used pulp and replacing it by fresh pulp that there has been a tendency on the part of the brewers not to effect such change as frequently as desirable, with the result that yeast particles work through the pulp and pass into the finished product, thus detracting from the wholesomeness of the beer. With my filter the cover may be removed, the filter tank turned upside down and the pulp dumped out and the parts easily washed and replaced. The invention includes the means by which I accomplish this. These means are hereinafter more fully described and a convenient embodiment thereof illustrated in the drawings.

Figure 4:
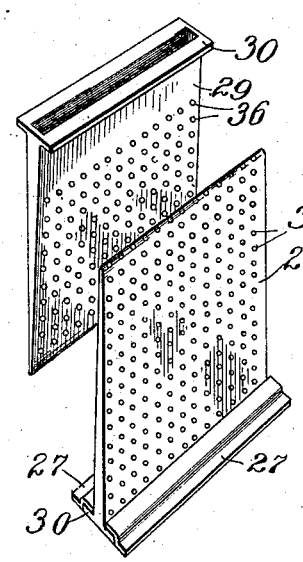
Figure 2:
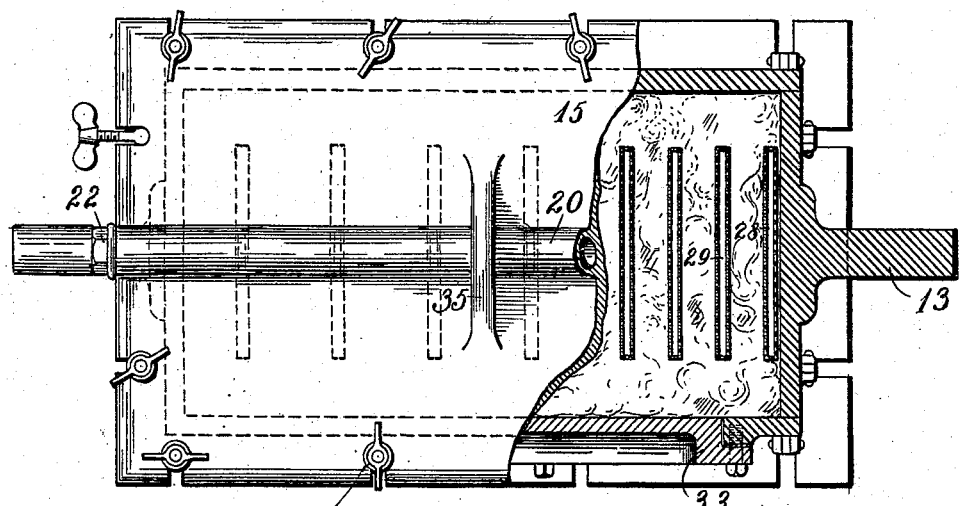
Figure 3:
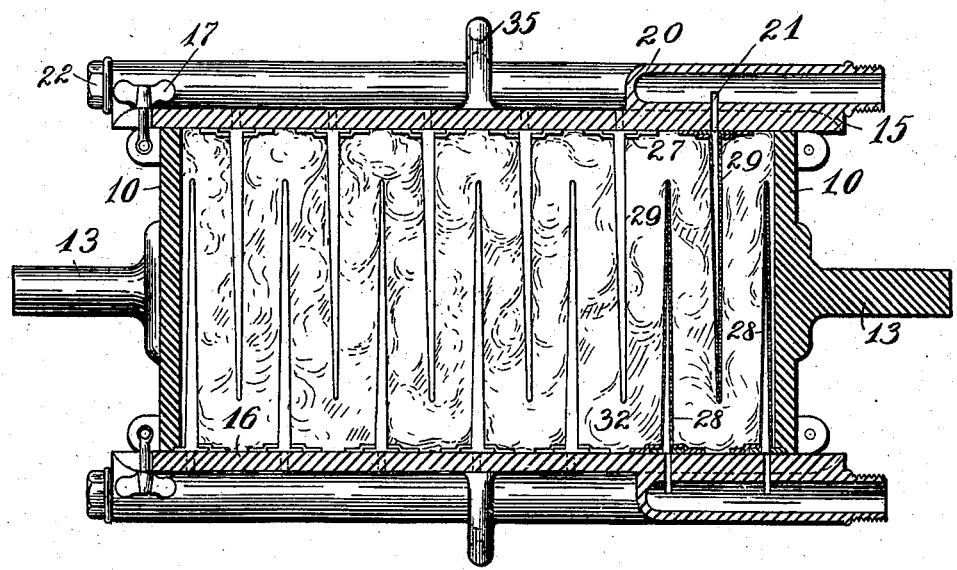

Figure 1 is a perspective view of the filter complete.
Fig. 2 is a plan thereof, partly sectional, and with the supporting bearings removed. Fig. 3 is a longitudinal section through the filter at right angles to Fig. 2. Fig. 4 is a perspective view of two of the wedge-shaped orifice members, of which a number are carried in the interior of the filter projecting alternately from opposite walls.

The body of my filter is composed, as shown in the drawings, of a rectangular box, having ends 10, 10, and sides 11 and 12. Each end 10 has a trunnion 13 projecting from it which is adapted to rest in a bearing on a suitable standard, such as that shown at 14 in Fig. 1.

The open sides of the filter box described are adapted to be closed by cover plates 15 and 16. These plates are shown as held in place by thumb nuts 17 screwing onto bolts 18 pivoted to the filter box and extending through notches 19 in the cover. Extending along the outside of each cover is a pipe 20 which may be applied to the cover or cast integrally with it, as shown. This pipe communicates with the interior of the box through numerous ports 21. One end of each pipe 20 is closed, as by plugs 22, and suitable intake and exit conduits are secured to the other ends of the two pipes, as indicated by the rubber hose 25 and 26 in Fig. 1.

On the inner side of each of the cover plates extending crosswise and parallel with the ports 21 are suitable overhanging or offset gibs 27, and slidable laterally into the space provided between these gibs and the face of the cover are the wedge-shaped perforated members 28 and 29 which have projecting flanges 30 at their larger ends to enable them to be held by the gibs 27. These wedge shaped members are hollow and their interiors communicate with the ports 21, whereby they provide numerous orifices for either the exit or intake of the liquid. Between these orifice members 28 and 29 is packed filtering material 32, which may be pulp, as is usually employed. This filtering material is adapted to be inserted through an opening in one of the sides, such opening being covered by a plate 33. The process of packing the filter is covered in my co-pending application filed contemporaneously herewith and numbered 369,936.

The wedge shaped orifice members are the same on the intake and exit side, except that the members 29 on the intake side have their perforations 36 beginning at points opposite the ends of the members 28, while the perforations 37 of the members 28 extend clear to the large end. Thus in Figs. 3 and 4, the members depending from the upper cover 15 are the intake members, and the members 28 rising from the lower cover 16 are the exit members. The reason for this difference in perforation is to prevent the beer which is forced in through the members 29 from wasting its force in the idle filter material which is beyond the end of the members 28,—while the members 28 are perforated clear up to their large end so that the beer may pass out from all portions of the filter material adjacent to these members 28.

In the operation of my filter, beer is forced in through the hose 25 to the pipe 20 on the cover 15,—thence passes into the filter and through the pulp, becomes purified and passes out through the pipe on the cover 16 and through the hose 26. When the pulp has removed nearly all the impurities it will hold, the pumping is stopped, the thumb nuts 17 loosened and the cover 15 with the members 29 drawn out. A suitable eye 35, is shown as provided on the cover to allow its convenient removal out of the way. Then the box is turned upside down and the pulp drops out by gravity. Then the thumb nuts holding the cover 16 are loosened and that cover is removed with the wedge members 28. When the covers have been removed, these wedge members are drawn out laterally, and this leaves all parts in condition to be thoroughly cleaned.

When the operation is to be resumed, the parts are returned to their normal position and pulp is supplied through the opening provided by removing the cover 33. While supplying this pulp, I maintain a suction on the pipe 26 to draw the pulp firmly into place and prevent any weak spots in it. This process of packing the filter is covered by my contemporaneous application referred to.

I claim:—

1. In a filter, the combination of a body having removable covers and orifice members removably carried by said covers and projecting inwardly therefrom, and packing between said members.

2. In a filter, the combination of a body having open opposite sides, a pair of covers adapted to close said sides, each cover carrying removable perforated members, the members projecting inwardly laterally from the two sides past each other, and filtering material between the said members.

3. In a filter, the combination of a body having open sides, a pair of covers adapted to close said sides, and orifice members secured to said covers and projecting inwardly alternately from the opposite sides.

4. In a filter, the combination of a body having open sides, a pair of covers adapted to close said sides, and hollow wedge-shaped orifice members removably secured to said covers and projecting inwardly alternately from the opposite sides.

5. In a filter, the combination with the body, of a removable cover, a conduit for the liquid carried thereby and having ports through the cover, and removable orifice members carried by the cover on its inner sides opposite said ports.

6. In a filter, the combination of a rectangular box having open opposite sides, a pair of covers adapted to removably close said sides, each cover carrying perforated members projecting inwardly laterally from the two sides past each other, filtering material between the said members, there being ports through the covers communicating with the interior of the perforated members, and conduits leading to or from said ports.

7. The combination with a filter body of a removable cover and perforated orifice members carried by the cover on its inner side.

8. The combination of a filter body, of a removable cover, and wedge-shaped perforated members carried by the cover on its inner side.

9. The combination with a body, of a removable cover, and wedge shaped perforated hollow members removably carried on the inner face of the cover, and passageways through the cover communicating with the interior of said wedge-shaped members.

10. The combination with the filter body open on its opposite sides, of a pair of covers adapted to removably close said sides, perforated hollow members removably secured on the inner faces of the covers and projecting laterally from opposite covers inwardly, ports through the covers communicating with the interiors of such hollow members, and conduits leading to and from said ports.

11. In a filter, the combination of a body having open opposite sides, removable covers for closing said sides, intake and exit members carried on the inner sides of said covers, and trunnions projecting from the ends of the body and adapted to support the filter and allow it to be inverted.

12. The combination in a filter of a body, a cover therefor and perforated hollow members removably carried by the inner face of the cover.

13. In a filter, the combination with a wall having ports through it, of gibs secured on the inner side of the wall adjacent to the ports, and hollow perforated members having external flanges adapted to slide between said gibs and the wall, the interior of the member communicating with the port.

14. The combination of a filter body having ends and two sides, the other two sides being open, cover plates for the open sides, bolts and thumb nuts for securing the cover plates in position, pipes on the outer sides of the covers, there being ports through the cover and plates communicating with said pipes, gibs on the inner side of said cover plates adjacent to the ports, and perforated wedge-shaped hollow members having external flanges adapted to slide between the gibs and cover plate, said hollow members having their interior communicating with the ports and projecting laterally from opposite cover plates, and filtering material between the hollow members.

In testimony whereof, I hereunto affix my signature in the presence of two witnesses.

GEORGE KNOCK.

Witnesses:
J. B. HULL,
WILLIAM PLOTZ.